(12) United States Patent
Casetti et al.

(10) Patent No.: US 10,771,117 B2
(45) Date of Patent: Sep. 8, 2020

(54) RADIO RESOURCE SCHEDULING FOR COORDINATED MULTI-POINT TRANSMISSION IN CELLULAR NETWORKS

(71) Applicant: TELECOM ITALIA S.p.A., Milan (IT)

(72) Inventors: Claudio Ettore Casetti, Turin (IT); Maurizio Fodrini, Turin (IT); Fabrizio Gatti, Turin (IT); Mohamad Tavakoli Sanij, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 16/093,352

(22) PCT Filed: Apr. 15, 2016

(86) PCT No.: PCT/EP2016/058321
§ 371 (c)(1),
(2) Date: Oct. 12, 2018

(87) PCT Pub. No.: WO2017/178063
PCT Pub. Date: Oct. 19, 2017

(65) Prior Publication Data
US 2019/0140703 A1    May 9, 2019

(51) Int. Cl.
*H04B 7/024* (2017.01)
*H04W 72/12* (2009.01)
(Continued)

(52) U.S. Cl.
CPC .......... *H04B 7/024* (2013.01); *H04L 5/0082* (2013.01); *H04W 72/1231* (2013.01); *H04W 28/16* (2013.01)

(58) Field of Classification Search
CPC ......... H04L 27/36; H04L 27/366; H04L 5/14; H04L 5/143; H04L 5/1461; H04L 69/323;
(Continued)

(56) References Cited

U.S. PATENT DOCUMENTS

| 2006/0182067 A1* | 8/2006 | Rinne | H04W 16/02 370/335 |
| 2007/0218840 A1* | 9/2007 | Gerlach | H04W 16/02 455/63.2 |

(Continued)

FOREIGN PATENT DOCUMENTS

| EP | 2 557 875 A1 | 2/2013 |
| WO | WO 2014/135186 A1 | 9/2014 |

OTHER PUBLICATIONS

International Search Report and Written Opinion dated Jan. 10, 2017 in PCT/EP2016/058321 filed Apr. 15, 2016.

*Primary Examiner* — Natasha W Cosme
(74) *Attorney, Agent, or Firm* — Oblon, McClelland, Maier & Neustadt, L.L.P.

(57) ABSTRACT

A method scheduling allocation of radio resources in a cellular network, including: selecting at least one first user equipment for performing a first type data exchange based on Coordinated Multi-Point technique and a second type data exchange not based on Coordinated Multi-Point technique, and selecting at least one second user equipment for performing only the second type data exchange; selecting at least one network node for performing the first type data exchange with the at least one first user equipment and the second type data exchange with at least one among the first and second user equipment; determining, for the at least one network node, a radio resource parameter indicative of a number of radio resources to be allocated for the first type data exchange and a number of radio resources to be allocated for the second type data exchange; allocating the radio resources based on the radio resource parameter.

15 Claims, 3 Drawing Sheets

Figure 1:
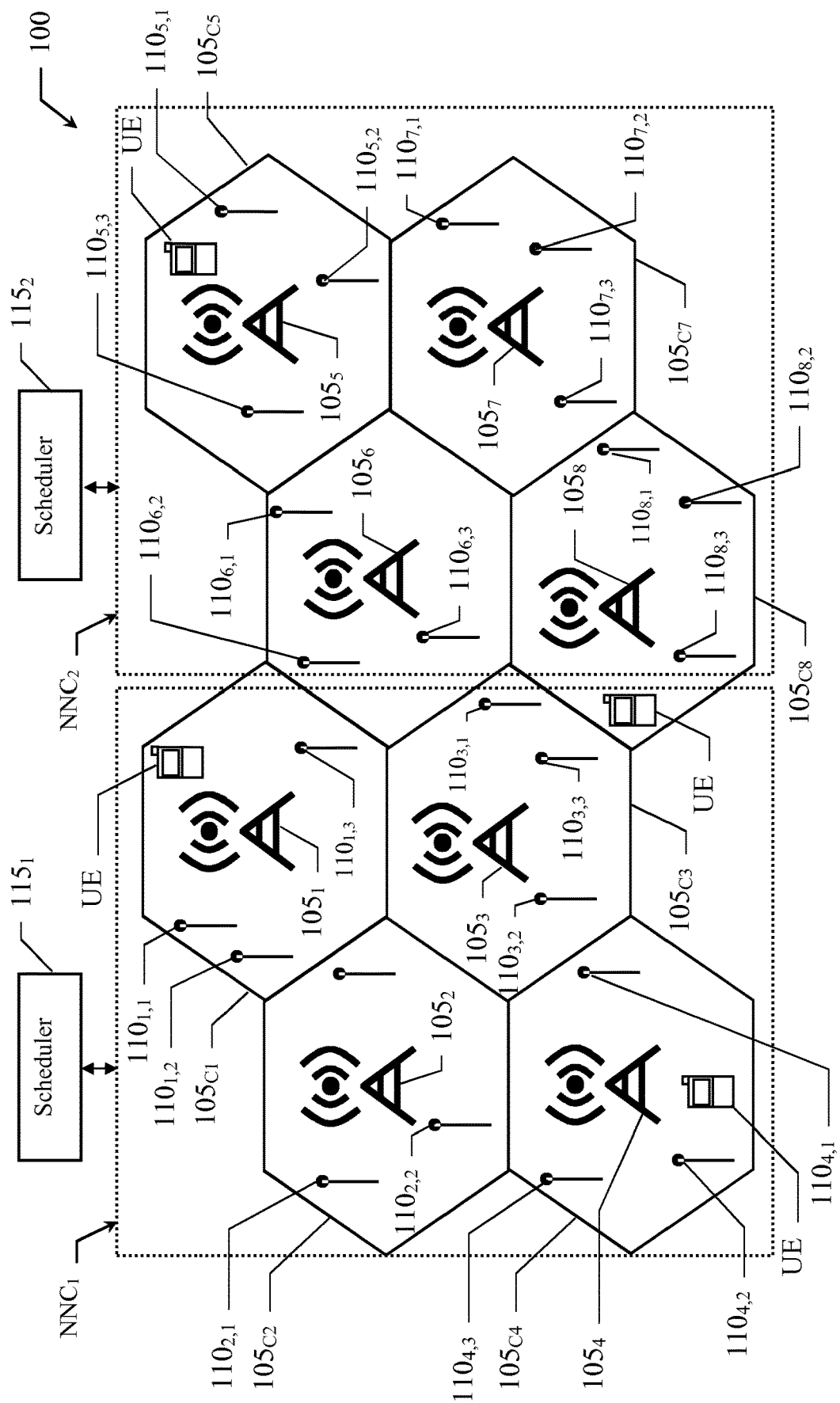

(51) Int. Cl.
*H04L 5/00* (2006.01)
*H04W 28/16* (2009.01)

(58) Field of Classification Search
CPC ....... H04L 7/042; H04L 5/023; H04L 69/329;
H04L 29/08072; H04L 65/60; H04L
43/04; H04L 12/14; H04L 1/0003; H04L
1/0007; H04L 1/0009; H04L 29/06027;
H04L 47/10; H04L 47/20; H04L 47/30
USPC ......................................................... 370/330
See application file for complete search history.

(56) References Cited

U.S. PATENT DOCUMENTS

| | | |
|---|---|---|
| 2013/0201896 A1 | 8/2013 | Ono et al. |
| 2014/0348096 A1 | 11/2014 | Nagata et al. |
| 2016/0007337 A1 | 1/2016 | Hessler et al. |

\* cited by examiner

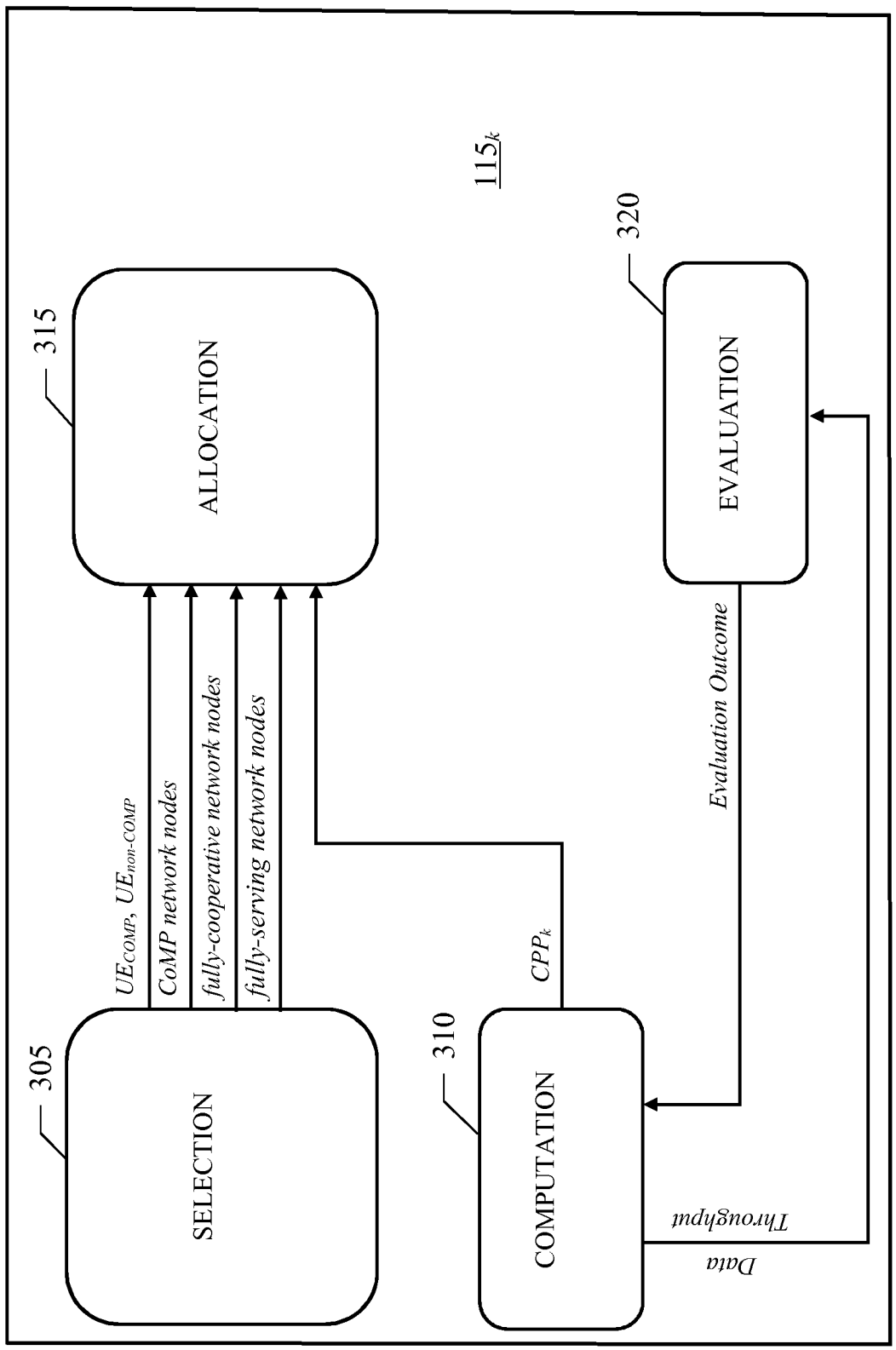

RADIO RESOURCE SCHEDULING FOR COORDINATED MULTI-POINT TRANSMISSION IN CELLULAR NETWORKS

BACKGROUND OF THE INVENTION

Field of the Invention

The present invention generally relates to wireless communications networks, such as cellular networks (such as LTE/LTE-Advanced cellular networks). More particularly, the present invention relates to radio resource scheduling for data exchange based on Coordinated Multi-Point technique in such cellular networks.

Overview of the Related Art

In the dynamic field of cellular networks, technological advancements are constantly occurring in order to make it possible for user equipment to enjoy consistent and quality performance as the capacity and speed of cellular networks improve.

While the past generation of cellular networks, collectively known as third generation ("3G") is still prevalent, the next generation of cellular networks, namely Long Term Evolution ("LTE") and its evolution ("LTE-Advanced"), collectively known as fourth generation ("4G"), are increrasingly spreading.

An approach to improve bandwidth while reducing bit error rates in LTE/LTE-Advanced cellular networks is based on Coordinated Multi-Point ("CoMP") functionality. According to CoMP functionality, a user equipment is allowed to perform multiple data exchange (i.e., transmission or reception) with multiple network nodes of the cellular network (the multiple data exchange being typically based on known "Multiple Input Multiple Output" (MIMO) technique).

Said multiple data exchange typically comprises data exchange between the user equipment and a respective serving network node and data exchange between the user equipment and one or more support or cooperative network nodes. In order to achieve that, each network node compliant with CoMP functionality preferably sets aside a fraction of radio resources to be allocated for data exchange between that network node and one or more user equipment connecting to it as their serving network node, and a second fraction of radio resources to be allocated for data exchange between that network node and one or more user equipment connecting to it as their cooperative network node.

Dajie Jiang; Qixing Wang; Jianjun Liu; Guangyi Liu; Chunfeng Cui, "*Uplink Coordinated Multi-Point Reception for LTE-Advanced Systems*" discloses an uplink CoMP-MU-MIMO scheme and the corresponding system level performance evaluation which shows that the uplink CoMP-MU-MIMO joint processing can bring significant gains to both the average sector throughput and the cell edge user throughput.

CN101442808 discloses a combined dispatching method for uplink multi-point cooperation in LTE-A. The method comprises the following steps: 1) determining cooperative and non-operative dispatching user; 2) dispatching of cooperative user in cell; 3) combined resource dispatching for cooperative user of cell; 4) dispatching for non-cooperative user of cell.

US2010177746 discloses techniques for supporting Coordinated MultiPoint (CoMP) transmission. For CoMP transmission, multiple cells may simultaneously send one or more data streams to one or more UEs on the same time-frequency resources based on short-term channel feedback from at least one UE to at least two cells. In an aspect, a semi-static configuration may be used by a set of cells for CoMP transmission to a UE. The semi-static configuration may indicate resource elements available to the set of cells to send CoMP transmission to the UE. The available resource elements may be determined based on a maximum number of TDM control symbols for all cells in the set and resource elements used for cell-specific reference signals by the cells in the set. A cell in the set may send data on the available resource elements to the UE for the CoMP transmission.

US2012033624 discloses methods, apparatuses and articles of manufacture that provide for partial downlink and uplink resource allocations among cooperating cells in a CoMP transmission to a user equipment. The resource allocation can be based on channel conditions and differing capabilities and restrictions of cooperating cells such as in support of heterogeneous network configurations.

EP2922333 discloses an uplink coordinated multipoint transmission (CoMP) set selecting method and system, and a device, which relate to the communications field, so that an uplink CoMP set of a cell or of user equipment (UE) served by a cell can be determined by means of exchange, between base stations, of at least channel state information-reference signal (CSI-RS) configuration information used for distinguishing cells.

SUMMARY OF INVENTION

The Applicant has recognized that none of the cited prior-art solutions is completely satisfactory. Indeed, the above-cited prior-art solutions are generally complex, and need relatively high computational capabilities (and, hence, high computation times).

In view of the above, the Applicant has tackled the problem of making radio resource allocation in a cellular network comprising both serving and cooperative network nodes more simple, reliable and effective, and, in order to achieve that, has devised a scheduling procedure wherein a number of radio resources to be allocated to each network node for data exchange to/from one or more user equipment connecting to it as their serving network node and a number of radio resources to be allocated to that network node for data exchange to/from one or more user equipment connecting to it as their cooperative network node are continuously updated according to data exchange overall performance associated with the user equipment and nodes that are involved.

One or more aspects of the present invention are set out in the independent claims, with advantageous features of the same solution that are indicated in the dependent claims, whose wording is enclosed herein verbatim by reference (with any advantageous feature being provided with reference to a specific aspect of the solution according to an embodiment of the invention that applies mutatis mutandis to any other aspect).

More specifically, one aspect of the solution according to embodiments of the present invention relates to a method for scheduling allocation of radio resources in a cellular network. The method comprises:

selecting at least one first user equipment for performing a first type data exchange (i.e. a data exchange of a first type or, equivalently, a first type of data exchange) based on Coordinated Multi-Point technique and a second type data exchange (i.e. a data exchange of a second type or, equivalently, a second type of data exchange) not based on Coordinated Multi-Point technique, and selecting at least one second user equipment for performing only said second type data exchange (i.e. a data exchange only of said second type, with such second type data exchange that may include any data exchange not based on Coordinated Multi-Point technique);

selecting at least one network node for performing said first type data exchange with the at least one first user equipment and said second type data exchange with at least one among said first and second user equipment;

determining, for the at least one network node, a radio resource parameter indicative of a number of radio resources to be allocated for the first type data exchange and of a number of radio resources to be allocated for the second type data exchange;

allocating the radio resources for the at least one network node based on said radio resource parameter;

causing data exchange to/from each first and second user equipment;

determining first and second performance parameters indicative of performance of the data exchange to/from, respectively, the at least one first user equipment and the at least one second user equipment;

updating said radio resource parameter according to the first and second performance parameters, and repeating said allocating.

According to an embodiment of the present invention, the method further comprises iterating said causing, said determining first and second performance parameters, said updating and said repeating.

According to an embodiment of the present invention, said updating said radio resource parameter according to the first and second performance parameters comprises:

increasing or decreasing the radio resource parameter according to a comparison between said first performance parameter and said second performance parameter.

According to an embodiment of the present invention, said determining first and second performance parameters comprises:

determining a data throughput of each first user equipment and a data throughput of each second user equipment, respectively, and preferably determining an average data throughput of the first user equipment and an average data throughput of the second user equipment.

According to an embodiment of the present invention, said causing data exchange to/from each first and second user equipment comprises causing data exchange to/from each first and second user equipment for a predetermined time window, wherein said determining a data throughput of each first user equipment and a data throughput of each second user equipment is preferably carried out within said predetermined time window.

According to an embodiment of the present invention, said predetermined time window comprises a plurality of "Transmission Time Intervals".

According to an embodiment of the present invention, said determining an average data throughput of the first user equipment and an average data throughput of the second user equipment further comprises:

selecting a subset of data throughputs of the first user equipment and a subset of the data throughputs of the second user equipment, and, preferably, averaging the subset of data throughputs of the first user equipment and the subset of data throughputs of the second user equipment.

According to an embodiment of the present invention, said selecting a subset of data throughputs of the first user equipment and a subset of the data throughputs of the second user equipment is based on a mean plus variance approach.

According to an embodiment of the present invention, said selecting at least one first user equipment, at least one second user equipment and at least one network node is based on power measurements.

According to an embodiment of the present invention, said power measurements comprise "Reference Signal Received Power" measurements.

According to an embodiment of the present invention, the radio resource parameter is based on "Frequency Reuse Factor".

Another aspect of the present invention proposes a computer program product directly loadable into a memory of a computer, the computer program product comprising software code means adapted to perform the above method steps when run on the computer.

A further aspect of the present invention proposes a scheduler unit for scheduling allocation of radio resources in a cellular network. The scheduler unit comprises:

a selection module for selecting at least one first user equipment for performing a first type data exchange based on Coordinated Multi-Point technique and a second type data exchange not based on Coordinated Multi-Point technique;

at least one second user equipment for performing only said second type data exchange, and at least one network node for performing said first type data exchange with the at least one first user equipment and said second type data exchange with at least one among said first and second user equipment, a computation module for determining, for the at least one network node, a radio resource parameter indicative of a number of radio resources to be allocated for the first type data exchange and of a number of radio resources to be allocated for the second type data exchange, determining, upon data exchange to/from each first and second user equipment, first and second performance parameters indicative of performance of the data exchange to/from, respectively, the at least one first user equipment and the at least one second user equipment, and for updating said radio resource parameter according to the first and second performance parameters, and an allocation module for allocating the radio resources for the at least one network node based on said radio resource parameter.

According to an embodiment of the present invention, the scheduler unit further comprises an evaluation module for carrying out a comparison between said first performance parameter and said second performance parameter, said radio resource parameter being preferably updated according to a result of said comparison.

BRIEF DESCRIPTION OF THE ANNEXED DRAWINGS

Figure 2:
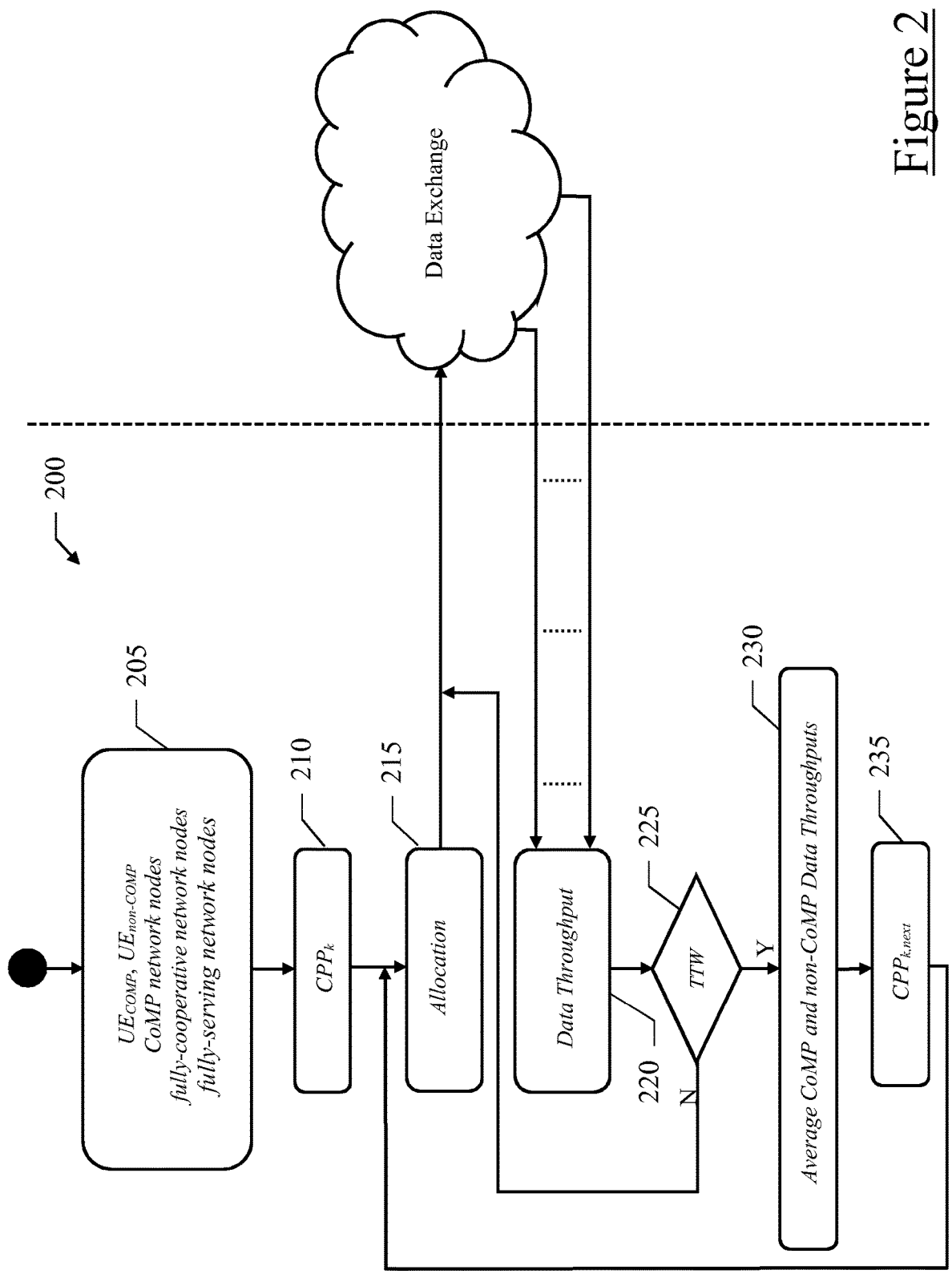

These and other features and advantages of the proposed solution will be made apparent by the following description of some exemplary and non limitative embodiments thereof; for its better intelligibility, the following description should be read making reference to the attached drawings, wherein:

FIG. 1 schematically shows a cellular network according to an embodiment of the present invention;

FIG. 2 schematically shows a swim lane activity diagram graphically representing, on the left, the workflow of activities for carrying out a scheduling procedure according to an embodiment of the present invention, and FIG. 3 schematically shows a scheduling unit implementing the scheduling procedure according to an embodiment of the present invention.

DETAILED DESCRIPTION OF PREFERRED EMBODIMENTS OF THE INVENTION

With reference to the drawings, a cellular network 100 (i.e., a portion thereof) according to an embodiment of the present invention is schematically shown in FIG. 1. The cellular network 100 (e.g., compliant with the 3GPP LTE/LTE-Advanced standard) comprises a number I of relatively high-power and wide-coverage transceiver stations (hereinafter, macro nodes) $105_i$ (i=1, 2, 3, 4, . . . I, with I=8 in the example at issue). In the example at issue of cellular network 100 compliant with the 3GPP LTE/LTE-Advanced standard, each macro node $105_i$ is an eNodeB—in any case, according to cellular network technologies, other transceiver stations may be envisaged without departing from the principles of the present invention.

Each macro node $105_i$ is configured to provide radio coverage over a relatively wide geographic area, also referred to as macro cell $105_{Ci}$ (for example, hexagonal in shape), for allowing one or more user equipment UE within the macro cells $105_{Ci}$ (e.g., a cellular phone, a personal digital assistant (PDA), a wireless modem, a wireless communication device, a handheld device, a laptop computer, or a cordless phone) to exchange data (e.g., web browsing, e-mailing, voice, or multimedia data).

As visible in the figure, the cellular network 100 preferably comprises, within each i-th macro cell $105_{Ci}$, a number J of lower-power, smaller coverage transceiver stations (e.g., pico, micro, and/or femto nodes), in the following referred to as small nodes and denoted by the number reference $110_{i,j}$ (j=1, 2, . . . J, with J=3 in the example at issue), each one identifying a respective small cell for increasing cellular network 100 capacity. In the following, the macro $105_i$ and small $110_{i,j}$ nodes will be also denoted, as a whole, as network nodes $105_i,110_{i,j}$ when distinguishing between macro $105_i$ and small $110_{i,j}$ nodes is not relevant.

For the sake of completeness, as well known by those having ordinary skill in the art, the network nodes $105_i,110_{i,j}$ form the radio access network. In turn, the radio access network is generally communicably coupled with one or more core networks (not shown), which may be coupled with other networks, such as the Internet and/or public switched telephone networks (not illustrated).

For the purposes of the present invention, at least one macro node $105_i$ and/or at least one small node $110_{i,j}$ are assumed to be capable of (i.e., to be suitable or configured for) performing data exchange (i.e., transmission and reception) based on "Coordinated Multi-Point" (CoMP) functionality. Preferably, the macro $105_i$ and/or small $110_{i,j}$ nodes can be selectively enabled with CoMP functionality according to cellular network 100 settings. In the exemplary considered scenario, CoMP functionality is enabled independently for both macro node $105_i$ and small $110_{i,j}$ nodes—in any case, the possibility that, according to cellular network 100 settings, CoMP functionality is enabled only for the macro nodes $105_i$ (or for a subset thereof), or only for the small nodes $110_{i,j}$ (or for a subset thereof) is not excluded. For the sake of conciseness, each network node $105_i,110_{i,j}$ for which CoMP functionality is enabled will be referred to as CoMP-enabled network node (in the considered example, all the macro $105_i$ and small $110_{i,j}$ nodes are CoMP-enabled network nodes).

According to CoMP functionality, a user equipment UE is allowed to perform multiple data exchange with multiple network nodes (preferably, as discussed above, among the network nodes $105_i,110_{i,j}$). Preferably, as herein assumed, said multiple data exchange comprises a data exchange of a first type (or, equivalently, a first type of data exchange or first type data exchange) between the user equipment UE and a respective serving network node (hereinafter, serving data exchange) and a data exchange of a second type (or, equivalently, a second type of data exchange or second type data exchange) between the user equipment UE and one or more support or cooperative network nodes (hereinafter, cooperative data exchange). In order to achieve that, each CoMP-enabled network node preferably sets aside a fraction of radio resources to be allocated for serving data exchange between that network node $105_i,110_{i,j}$ and one or more user equipment UE connecting to it as their serving network node, and a second fraction of radio resources to be allocated for cooperative data exchange between that network node $105_i,110_{i,j}$ and one or more user equipment UE connecting to it as their cooperative network node.

In other words, according to the exemplary considered embodiment, each CoMP-enabled network node may act both as serving network node and coordinated network node for a number of user equipment UE connecting to it. In any case, according to a preferred embodiment of the present invention, according to the data exchange (i.e., serving or cooperative data exchange) to be carried out between a CoMP-enabled network node and user equipment UE connecting to it, that network node may act only as serving network node (for example, in absence of user equipment UE connecting to that that network node as their cooperative network node), in which case the fraction of radio resources originally intended to be allocated for cooperative data exchange are preferably made available to be allocated for serving data exchange, or only as cooperative network node (for example, in absence of user equipment UE connecting to that that network node as their serving network node), in which case the fraction of radio resources originally intended to be allocated for cooperative data exchange are preferably made available to be allocated for serving data exchange.

In the following, a CoMP-enabled network node to which one or more user equipment UE connect as their serving network node and one or more user equipment UE connect as their cooperative network node will be referred to as CoMP network node, a CoMP-enabled network node to which one or more user equipment UE connect only as their serving network node (i.e., with no user equipment UE connecting to it as their cooperative network node) will be referred to as fully-serving network node, and a CoMP-enabled network node to which one or more user equipment UE connect only as their cooperative network node (i.e., with no user equipment UE connecting to it as their serving network node) will be referred to as fully-cooperative network node.

For the purposes of the present invention, user equipment UE performing both serving data exchange (to and/or from respective serving network nodes) and cooperative data exchange (to and/or from respective cooperative network nodes) will be referred to as CoMP user equipment $UE_{CoMP}$, whereas user equipment UE performing only serving data exchange (to and/or from respective serving network nodes) will be referred to as non-CoMP user equipment $UE_{non-CoMP}$. Thus, each serving network node to which one or more CoMP $UE_{CoMP}$ or non-CoMP user equipment connect for serving data exchange may in its turn be either a CoMP network node or a fully-serving network node (according to whether one or more CoMP user equipment $UE_{CoMP}$ connect to it also as their cooperative network node or not, respectively), whereas each cooperative network node to which one or more CoMP $UE_{CoMP}$ or non-CoMP user equipment connect for cooperative data exchange may in its turn be either a CoMP network node or a fully-cooperative network node (according to whether one or more CoMP $UE_{CoMP}$ or non-CoMP user equipment connect to it also as their serving network node or not, respectively).

Exemplary criteria for determining, for each user equipment UE, the serving and cooperative network nodes (and, hence, the CoMP $UE_{CoMP}$ and non-CoMP $UE_{non-CoMP}$ user equipment, and the CoMP, fully-serving and fully-cooperative network nodes) will be discussed in the following.

According to an embodiment of the present invention, the cellular network 100 is divided into clusters of network nodes, each one referred to as network node cluster $NNC_k$ (k=1, 2 . . . , K—with K=2 in the example at issue). Each network node $105_i, 110_{i,j}$ of each network node cluster $NNC_k$ preferably acts as a candidate serving network node and/or as a candidate cooperative network node for one or more user equipment UE associated with that network node cluster $NNC_k$. The user equipment UE/network node cluster $NNC_k$ association is preferably based on a predetermined relationship, such as a distance and/or a radio coverage relationship, between the user equipment UE and at least one network node $105_i, 110_{i,j}$ of the network node cluster $NNC_k$. According to the exemplary considered embodiment, a user equipment UE is associated with the network node cluster $NNC_k$ to which the network node $105_i, 110_{i,j}$ identified as serving network node for that user equipment UE belongs, and preferably only the network nodes $105_i, 110_{i,j}$ belonging to said network node cluster $NNC_k$ are considered as candidate cooperative network nodes.

Preferably, each network node cluster $NNC_k$ comprises a predetermined number of macro $105_i$ and/or small $110_{i,j}$ nodes (with each network node cluster $NNC_k$ that may comprise a respective number of macro $105_i$ and/or small $110_{i,j}$ nodes). More preferably, each network node cluster $NNC_k$ comprises a fixed set of macro $105_i$ and/or small $110_{i,j}$ nodes (i.e., a set of macro $105_i$ and/or small $110_{i,j}$ nodes that is unchanged, or substantially unchanged, over the cellular network 100 operation). Even more preferably, as herein assumed, each network node cluster $NNC_k$ comprises a fixed set of macro nodes $105_i$ (for example, a fixed set of adjacent macro nodes $105_i$) and the small $110_{i,j}$ nodes associated therewith (for example the small nodes $110_{i,j}$ pertaining thereto, such as the small nodes $110_{i,j}$ within the respective macro cells $105_{Ci}$). According to alternative embodiments of the present invention, each network node cluster $NNC_k$ comprises a fixed set of adjacent or non-adjacent macro nodes $105_i$ and a fixed set of randomly distributed small nodes $110_{i,j}$ (i.e., a subset of the small nodes $110_{i,j}$ pertaining to the macro nodes $105_i$ and/or small nodes $110_{i,j}$ pertaining to macro nodes $105_i$ of a different network node cluster $NNC_k$).

In the exemplary embodiment illustrated in FIG. 1, the network node cluster $NNC_1$ comprises the macro nodes $105_1$-$105_4$ and the associated small nodes $110_{1,1}, 110_{1,2}, 110_{1,3}$-$110_{4,1}, 110_{4,2}, 110_{4,3}$ and the network node cluster $NNC_2$ comprises the macro nodes $105_5$-$105_8$ and the associated small nodes $110_{5,1}, 110_{5,2}, 110_{5,3}$-$110_{8,1}, 110_{8,2}, 110_{8,3}$.

Although in the above considered embodiment a static clustering approach wherein each network node cluster $NNC_k$ comprises a fixed set of macro $105_i$ and/or small $110_{i,j}$ nodes has been exemplary assumed, different clustering approaches may also be envisaged without departing from the principles of the present invention (for example, a dynamic clustering approach wherein one or more network node clusters $NNC_k$ are dynamically or periodically updated, or a combination of static and dynamic clustering approaches).

According to an embodiment of the present invention, each network node cluster $NNC_k$ (e.g., through a scheduling unit or scheduler $115_k$ associated therewith) is configured to carry out a scheduling procedure (or method) for effectively scheduling allocation of radio resources for serving and/or coordinated data exchange between each CoMP $UE_{CoMP}$ and non-CoMP $UE_{non-CoMP}$ user equipment and the respective serving and cooperative network nodes. Although each scheduler $115_k$ has been exemplary illustrated as a single block physically separated from the respective network node cluster $NNC_k$, the principles of the present invention equivalently apply wherever (and in whichever way) its physical implementation actually takes place (as also discussed herebelow). In any case, the possibility of providing a single scheduler managing all the network node clusters $NNC_k$ is not excluded.

In the exemplary considered cellular network 100, which is compliant with 3GPP LTE/LTE-Advanced specifications, radio resources are allocated in time/frequency domain. In time domain, radio resources are distributed every "Transmission Time Interval" (TTI), each one lasting 1 ms and comprising two time slots of 0.5 ms, whereas in frequency domain the whole bandwidth is divided into 180-kHz subchannels (corresponding to 12 consecutive and equally spaced sub-carriers). A time/frequency radio resource, spanning over one TTI lasting 1.0 ms in time domain and over one sub-channel in frequency domain, is referred to as "Physical Resources Block", and corresponds to the smallest radio resource that can be allocated to a user equipment UE for data exchange. In any case, in the following, the generic wording "radio resource" will be still used, it meaning that the principles of the present invention equivalently apply to any other wireless communication network having a different definition of radio resource and a different management thereof.

FIG. 2 schematically shows, according to an embodiment of the present invention, a swim lane activity diagram graphically representing, on the left, the workflow of activities for carrying out (at scheduler $115_k$ side) the scheduling procedure 200 in the network node cluster $NNC_k$ and, on the right, data exchange between the (CoMP $UE_{CoMP}$ and non-CoMP $UE_{non-CoMP}$) user equipment associated with that network node cluster $NNC_k$ based on radio resource allocation scheduled by the scheduling procedure 200.

For ease of description, joint reference will be made to FIG. 3, the latter schematically showing, in terms of functional modules, a scheduler $115_k$ implementing the scheduling procedure 200 according to an embodiment of the present invention. As visible in such figure, the scheduler $115_k$ preferably comprises a selection module 305, a computation module 310, an allocation module 315 and an evaluation module 320, whose exemplary purposes will be progressively detailed in the following while discussing the scheduling procedure 200. It is pointed out that the use of the term "module" is herein intended to emphasize functional (rather than implementation) aspects thereof. Indeed, without losing of generality, each module may be implemented by software (in which case, the resulting scheduling procedure 200 would be performed by proper code means included in a computer program, when the program is run on a computer), hardware, and/or a combination thereof. Moreover, the modules may also reflect, at least conceptually, the physical structure of the scheduler $115_k$. However, the modules may have, by the physical viewpoint, distributed nature, it being understood that, by the logical viewpoint, they are all part of the scheduler $115_k$, wherever (and in whichever way) their physical implementation actually takes place. For example, each scheduler $115_k$ (or one or more modules thereof) may physically reside, at least in part, at one or more macro nodes $105_i$ of the respective network node cluster $NNC_k$.

Additionally or alternatively, the activity (i.e., action and decision) nodes, or groups of activity nodes, illustrated in the activity diagram of the scheduling procedure 200 may also represent respective operative modules of the scheduler $115_k$.

Broadly speaking, the scheduling procedure 200 (for the k-th network node cluster $NNC_k$) is aimed at:
- selecting the CoMP user equipment $UE_{COMP}$ (and the associated serving and cooperative network nodes), and the non-CoMP user equipment $UE_{non-COMP}$ (and the associated serving network nodes)—action node 205. Thus, among the user equipment UE of the k-th network node cluster $NNC_k$, the CoMP $UE_{COMP}$ and non-CoMP $UE_{non-COMP}$ user equipment are selected, and, among the CoMP-enabled network nodes, the CoMP, fully-serving and fully-cooperative network nodes are selected (as mentioned above, each CoMP-enabled network node is designated as CoMP, fully-serving or fully-cooperative network node based on the number of user equipment UE connecting to it as their serving network node and on the number of user equipment UE connecting to it as their cooperative network node). In the following discussion, the CoMP $UE_{COMP}$ and non-CoMP $UE_{non-COMP}$ user equipment and the CoMP, fully-serving and fully-cooperative network nodes determined at action node 205 will be assumed unchanged over time (however, as will be understood in the following when discussing exemplary timing setting, this is a reasonable assumption for a relatively high number of iterations of the scheduling procedure 200). Preferably, the selection of the CoMP $UE_{COMP}$ and non-CoMP $UE_{non-COMP}$ user equipment, and of the CoMP, fully-serving and fully-cooperative network nodes is carried out at the selection module 305 of the scheduler $115_k$;
- determining, for the CoMP-enabled network nodes of the network node cluster $NNC_k$, a radio resource parameter $CPP_k$ indicative of a number of radio resources to be allocated to each CoMP-enabled network node for performing the serving data exchange and of a number of radio resources to be allocated to each CoMP-enabled network node for performing the cooperative data exchange—action node 210. Preferably, the radio resource parameter $CPP_k$ is expressed as the percentage of radio resources to be allocated to each CoMP-enabled network node for cooperative data exchanges. More preferably, the radio resource parameter $CPP_k$ ranges from 1% to 50% (and is updated at each running to the scheduling procedure 200). Even more preferably, when frequency reuse is used as interference management technique, the radio resource parameter $CPP_k$ ranges from 1% to a maximum value depending on frequency reuse factor (for example, with frequency reuse factor 4, the maximum preferable value of the radio resource parameter $CPP_k$ is 25%). Still more preferably, at the first running of the scheduling procedure 200 the radio resource parameter $CPP_k$ is set at an initial value sufficiently below the maximum value to allow the scheduling procedure 200 to quickly determine an optimal value of the radio resource parameter $CPP_k$ with a relatively low number of iterations (for example, when the maximum value of the radio resource parameter $CPP_k$ is set at 25%, its initial value may be set at 2%). According to a preferred embodiment of the present invention, as herein assumed, only the radio resource parameter $CPP_k$ for CoMP network nodes is updated at each running of the scheduling procedure 200, whereas the radio resource parameter $CPP_k$ for fully-serving network nodes is fixedly set at 0% (it meaning that the fraction of radio resources originally intended to be allocated for cooperative data exchange are made available to be allocated for serving data exchange), and the radio resource parameter $CPP_k$ for fully-cooperative network nodes is fixedly set at 100% (it meaning that the fraction of radio resources originally intended to be allocated for serving data exchange are made available to be allocated for cooperative data exchange). Preferably, the determining of the radio resource parameter $CPP_k$ (as well as the updating thereof at each following iteration of the scheduling procedure 200) is carried out at the computation module 310 of the scheduler $115_k$;
- allocating the radio resources for each network node based on said radio resource parameter $CPP_k$—action node 215. As illustrated in the figure (see right side thereof), after radio resource allocation, the CoMP $UE_{COMP}$ and non-CoMP $UE_{non-COMP}$ user equipment are allowed to exchange data with the respective (serving and cooperative) network nodes. Preferably, the radio resource allocation for each network node is carried out at the allocation module 315 of the scheduler $115_k$ upon reception of the selected CoMP $UE_{COMP}$ and non-CoMP $UE_{non-COMP}$ user equipment, and of the selected CoMP, fully-serving and fully-cooperative network nodes from the selection module 305 of the scheduler $115_k$, and upon reception of the radio resource parameter $CPP_k$ (or of the updated radio resource parameter) from the computation module 310 of the scheduler $115_k$;
- determining a performance parameter indicative of performance of the data exchange to/from the CoMP user equipment $UE_{COMP}$ (hereinafter, CoMP performance parameter) and a performance parameter indicative of performance of the data exchange to/from the non-CoMP user equipment $UE_{non-COMP}$ (hereinafter, non-CoMP performance parameter)—nodes 220-230. According to a preferred embodiment of the present invention, discussed in the following, the CoMP performance parameter is an average CoMP data throughput associated with all the CoMP user equipment $UE_{COMP}$ that exchanged data over a predefined transmission time window, and the non-CoMP performance parameter is an average non-CoMP data throughput associated with all the non-CoMP user equipment $UE_{non-COMP}$ that exchanged data over that predefined transmission time window. Preferably, the CoMP performance parameter (such as the average CoMP data throughput) and the non-CoMP performance parameter (such as the average non-CoMP data throughput) are determined at the computation module 310 (or, alternatively, to a different, or dedicated, computation module, not shown) according to proper signaling from the CoMP $UE_{COMP}$ and non-CoMP $UE_{non-COMP}$ user equipment, and are fed to the evaluation module 320 of the scheduler 115$_k$; and updating the radio resource parameter $CPP_k$ according to CoMP and non-CoMP performance parameters—action node 235. Preferably, the radio resource parameter $CPP_k$ is updated at the computation module 310 according to an evaluation outcome (based on the CoMP and non-CoMP performance parameters) from the evaluation module 320, as better discussed in the following.

Thereafter, the scheduling procedure 200 iterates action nodes 215-235 to continuously adjust/refine the radio resource parameter $CPP_k$ to improve cellular network 100 performance.

Preferably, the CoMP user equipment $UE_{COMP}$ (and the associated serving and cooperative network nodes), and the non-CoMP user equipment $UE_{non-COMP}$ (and the associated serving network nodes) are determined (action node 210) according to signal quality measurements, said signal quality measurements being for example based on power measurements of one or more predetermined signals. More preferably, said power measurements are or comprise "Reference Signal Received Power" (RSRP) measurements. Even more preferably, the CoMP user equipment $UE_{COMP}$ (and the associated serving and cooperative network nodes), and the non-CoMP user equipment $UE_{non-COMP}$ (and the associated serving network nodes) are determined according to the following logical steps performed for each user equipment UE:

a. the serving network node for that user equipment UE is selected;
b. the network node cluster $NNC_k$ for that user equipment UE is selected, preferably based on the network node cluster $NNC_k$ to which the serving network node for that user equipment UE belongs (the (possible) one or more cooperative network nodes for that user equipment UE being selected among the CoMP-enabled network nodes belonging to the network node cluster $NNC_k$ selected for that user equipment UE);
c. a CoMP-enabled network node is selected as cooperative network node for that user equipment UE (which thus becomes a CoMP user equipment $UE_{COMP}$) if the RSRP measurement associated with that CoMP-enabled network node is lower than the RSRP measurement associated with the serving network node (otherwise, handover toward that CoMP-enabled network node preferably takes place). Preferably, when the CoMP-enabled network node is a small node, it is selected as cooperative network node for that user equipment UE (which thus becomes a CoMP user equipment $UE_{COMP}$) if the RSRP measurement associated with that network node is higher than the RSRP measurement associated with the serving network node by (i.e. minus) a predefined (and, preferably, selectable) amount or margin (e.g., expressed in dB), so as to compensate the power gap between macro and small nodes.

According to an embodiment of the present invention, the radio resource allocation for each network node (action node 215) is carried out according to a proper interference management technique (such as frequency reuse) and, preferably, according proportional fair policy (in any case, any suitable radio resource allocation policy, such as Round-Robin policy, may be considered without affecting the principles of the present invention).

As illustrated in the figure by cloud block "Data Exchange", after radio resource allocation, the CoMP $UE_{COMP}$ and non-CoMP $UE_{non-COMP}$ user equipment are allowed to exchange data to/from the respective (serving and cooperative). Preferably, as better discussed in the following, the CoMP $UE_{COMP}$ and non-CoMP $UE_{non-COMP}$ user equipment are allowed to exchange data to/from the respective (serving and cooperative) network nodes with a radio resource allocation that is based on a same value of the radio resource parameter $CCP_k$ for a predetermined transmission time window TTW (for example, including a predetermined number of TTI, as discussed below).

Preferably, although not necessarily, the CoMP and non-CoMP performance parameters comprise, respectively, a data throughput associated with the CoMP user equipment $UE_{COMP}$ (hereinafter, CoMP data throughput) and a data throughput associated with the non-CoMP user equipment $UE_{non-COMP}$ (hereinafter, CoMP data throughput).

Each CoMP or non-CoMP data throughput is preferably computed, preferably at scheduler 115$_k$ side, according to "Signal to Interference Plus Noise Ratio (SINR)" and to the number of radio resources allocated for data exchange to/from the respective CoMP $UE_{COMP}$ or non-CoMP $UE_{non-COMP}$ user equipment. More preferably, each CoMP or non-CoMP data throughput is computed at scheduler 115$_k$ side, preferably at each TTI, according to proper signaling from the CoMP $UE_{COMP}$ and non-CoMP $UE_{non-COMP}$ user equipment that have exchanged data at the considered TTI. This is conceptually represented in the figure by multiple arrow connection between the cloud block "Data Exchange" and the action node 220 (each arrow connection being intended to represent signaling between each CoMP $UE_{COMP}$ or non-CoMP $UE_{non-COMP}$ user equipment within the network node cluster $NNC_k$ and the corresponding (module of the) scheduler 115$_k$).

Advantageously, as mentioned above, in order to determine the CoMP data throughput for each CoMP user equipment $UE_{COMP}$ and the non-CoMP data throughput for each non-CoMP user equipment $UE_{non-COMP}$ with an adequate measurement stability, the CoMP $UE_{COMP}$ and non-CoMP $UE_{non-COMP}$ user equipment are allowed to exchange data to/from the respective (serving and cooperative) network nodes for a predetermined transmission time window TTW including a predefined number of TTI—this is conceptually represented in the figure by loop connection between decision node 225 (at which the scheduling procedure 200 checks whether the transmission time window TTW is over) and the cloud block "Data Exchange".

Preferably, the number of TTIs within each transmission time window TTW, and hence the time length of the transmission time window TTW, is determined according to the radio resource allocation policy and/or latency requirements. For example, in the considered example of proportional fair policy, a transmission time window TTW comprising about 100 TTIs may be envisaged for determining accurate average CoMP and non-CoMP data throughputs while avoiding latency. Incidentally, such an extent of the time length of the transmission time window TTW justifies the above assumption of considering the CoMP $UE_{COMP}$ and non-CoMP $UE_{non-COMP}$ user equipment and the CoMP, fully-serving and fully-cooperative network nodes unchanged for a relatively high number of iterations of the scheduling procedure 200. In any case, the possibility of implementing (at a suitable phase of the scheduling procedure 200) a check on the actual user equipment UE within the network node cluster $NNC_k$, and, preferably, a re-determining of the CoMP user equipment $UE_{COMP}$ (and the associated serving and cooperative network nodes) and of the non-CoMP user equipment $UE_{non\text{-}CoMP}$ (and the associated serving network nodes)—e.g., similarly to action node 205—is not excluded.

Back to the activity diagram, if the transmission time window TTW is not over (exit branch N of the decision node 225), the CoMP $UE_{CoMP}$ and non-CoMP $UE_{non\text{-}CoMP}$ user equipment are allowed to exchange data to/from the respective (serving and cooperative) network nodes for the next TTI with a radio resource allocation based on the same radio resource parameter $CPP_k$ as the previous TTI (the actual radio resource allocation instead depending on the specific radio resource allocation policy), otherwise (exit branch Y of the decision node 225), it meaning that the transmission time window TTW is over, the scheduling procedure 200 updates the radio resource parameter $CPP_k$ according to the CoMP and non-CoMP data throughputs (as discussed below).

Preferably, after the transmission time window TTW is over (exit branch Y of the decision node 230), the CoMP and non-CoMP data throughputs for the CoMP $UE_{CoMP}$ and non-CoMP $UE_{non\text{-}CoMP}$ user equipment are averaged over the transmission time window TTW (action node 235), thereby obtaining a corresponding average CoMP data throughput associated with (e.g., all) the CoMP user equipment $UE_{CoMP}$ that exchanged data over that transmission time window TTW, and a corresponding average non-CoMP data throughput associated with (e.g., all) the non-CoMP user equipment $UE_{non\text{-}CoMP}$ that exchanged data over that transmission time window TTW.

According to an embodiment of the present invention, the average CoMP and non-CoMP data throughputs are determined on a selected subset of data throughputs of the CoMP user equipment $UE_{CoMP}$ and on a selected subset of the data throughputs of the non-CoMP user equipment $UE_{non\text{-}CoMP}$ (wherein said selection of the subsets of data throughputs is advantageously based, but is not limited to, a mean plus variance approach), and by averaging the subset of data throughputs of the first user equipment and the subset of data throughputs of the second user equipment.

In the preferred embodiment herein exemplary assumed, the average CoMP and non-CoMP data throughputs are determined for filtered CoMP and non-CoMP data throughputs only, e.g. by excluding/filtering out from the average computation those CoMP and non-CoMP data throughputs that are excessively high compared to others (due, for example, to exceptionally advantageous location or connection type of some CoMP $UE_{CoMP}$ and non-CoMP $UE_{non\text{-}COMP}$ user equipment within the network node cluster $NNC_k$), and, preferably, those CoMP and non-CoMP data throughputs above a predefined value or respective predefined values (so as to conservatively take into account for average computation only the "worst cases" of CoMP and non-CoMP data throughputs)—in any case, in embodiments wherein selection of the subset of data throughputs of the CoMP user equipment $UE_{CoMP}$ and of the subset of the data throughputs of the non-CoMP user equipment $UE_{non\text{-}COMP}$ is carried out without a "filtering", random (or substantially random) data throughputs of the CoMP user equipment $UE_{CoMP}$ and of the non-CoMP user equipment $UE_{non\text{-}COMP}$ may be selected for being included in the respective subsets. According to an embodiment of the present invention, the average CoMP and non-CoMP data throughputs based on said filtering are determined as follows:

a. from the CoMP data throughputs each one associated with a respective CoMP user equipment $UE_{CoMP}$ and the non-CoMP data throughputs each one associated with a respective non-CoMP user equipment $UE_{non\text{-}COMP}$, as computed at action node 220, the CoMP and non-CoMP data throughputs that are excessively high compared to others (due, for example, to exceptionally advantageous location or connection type of some CoMP $UE_{CoMP}$ and non-CoMP $UE_{non\text{-}COMP}$ user equipment) are filtered out. Preferably, said filtering is carried out based on a mean plus variance approach;

b. the filtered CoMP and non-CoMP data throughputs are increasingly ordered (in respective lists);

c. each filtered CoMP data throughput is normalized according to the highest CoMP data throughput among the filtered CoMP data throughputs, thus originating a corresponding index for each normalized filtered CoMP data throughput. Similarly, each filtered non-CoMP data throughput is normalized according to the highest non-CoMP data throughput among the filtered non-CoMP data throughputs, thus originating a corresponding index for each normalized filtered non-CoMP data throughput—as will be understood from the following discussion, the index allows computing (and comparing) average CoMP and non-CoMP data throughputs referred to a same scale. Each index ranges, by definition of normalization, between values 0 and 1 (as a result of the increasing order of the filtered data throughputs, the values 0 and 1 are associated with the lowest and highest filtered data throughputs, respectively). An example of filtered data throughputs (e.g., expressed in Mbps), and of respective indices is listed in the table below:

| Filtered Data Throughput | | | | | | | | | | |
|---|---|---|---|---|---|---|---|---|---|---|
| 1 | 2 | 4 | 6 | 7 | 9 | 12 | 13 | 15 | 20 | 25 |
| Index 0 | 0.08 | 0.16 | 0.24 | 0.28 | 0.36 | 0.48 | 0.52 | 0.6 | 0.8 | 1 | d. the average CoMP data throughput is computed only for the filtered CoMP data throughputs whose index is below a predefined value, and the average non-CoMP data throughput is computed only for the filtered non-CoMP data throughputs whose index is below a predefined value. Back to the numerical example of the above table, assuming an index of 0.25, the average data throughput would be (1+2+4+6+7)/5=4 Mbps.

Back to the activity diagram, after computing the average CoMP and non-CoMP data throughputs (action node 230), the scheduling procedure 200 updates the radio resource parameter $CPP_k$ according to the average CoMP and non-CoMP data throughputs (preferably, according to a comparison therebetween)—action node 235.

According to an embodiment of the present invention:

1) if the average CoMP data throughput is lower than the average non-CoMP data throughput, it meaning that CoMP user equipment $UE_{CoMP}$ suffer from shortage of radio resources as compared to non-CoMP user equipment $UE_{non\text{-}COMP}$, the radio resource parameter $CPP_k$ is increased by a first amount. Preferably, such a first amount is a percentage amount (for example, ranging from 2% to 4%). Even more preferably, said first amount depends on the gap between the average CoMP data throughput and the average non-CoMP data throughput (for example, the higher the gap, the higher the first amount);

2) if the average CoMP data throughput is higher than the average non-CoMP data throughput, it meaning that non-CoMP user equipment $UE_{non\text{-}COMP}$ suffer from shortage of radio resources as compared to CoMP user equipment $UE_{CoMP}$, the radio resource parameter $CPP_k$ is decreased by a second amount. According to an embodiment of the present invention, the second amount is a percentage amount similar to the first amount (and for which similar considerations concerning the percentage range according to the gap between the average CoMP data throughput and the average non-CoMP data throughput apply). Alternatively, according to a preferred embodiment of the present invention, the radio resource parameter for the next transmission time window TTW (denoted as $CPP_{k,next}$) is computed according to the average CoMP and non-CoMP data throughput and to the number of available radio resources, for example according to the following formula (wherein $T_{A,non-CoMP}$ and $T_{A,CoMP}$ denote the average CoMP and non-CoMP data throughput, respectively, $N_{PRB}$ denotes the number of available radio resources, and the symbol $\lfloor \ \rfloor$ denotes the floor function, i.e. the approximation to the integer without fractional):

$$CPP_{k,next} = \frac{1}{N_{PRB}} * \left\lfloor \left(CPP_k * N_{PRB} * \frac{T_{A,non-COMP}}{T_{A,COMP}}\right) + 1 \right\rfloor$$

3) if the average CoMP data throughput is equal to the average non-CoMP data throughput, the radio resource parameter $CPP_k$ is unchanged for the next transmission time window TTW.

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the cellular network has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

The invention claimed is:

1. A method for scheduling allocation of radio resources in a cellular network, the method comprising:
   selecting at least one first user equipment for performing a first type data exchange based on Coordinated Multi-Point technique and a second type data exchange not based on the Coordinated Multi-Point technique, and selecting at least one second user equipment for performing only the second type data exchange;
   selecting at least one network node for performing the first type data exchange with the at least one first user equipment and the second type data exchange with at least one among the first and second user equipment;
   determining, for the at least one network node, a radio resource parameter indicative of a number of radio resources to be allocated for the first type data exchange and of a number of radio resources to be allocated for the second type data exchange;
   allocating the radio resources for the at least one network node based on the radio resource parameter;
   causing data exchange with each first and second user equipment;
   determining first and second performance parameters indicative of performance of the data exchange with, respectively, the at least one first user equipment and the at least one second user equipment;
   updating the radio resource parameter according to the first and second performance parameters; and
   continuously refining the allocating of the radio resources for the at least one network node.

2. The method according to claim 1, further comprising:
   iterating the causing, the determining first and second performance parameters, the updating, and the repeating the allocating.

3. The method according to claim 1, wherein the updating the radio resource parameter according to the first and second performance parameters comprises:
   increasing or decreasing the radio resource parameter according to a comparison between the first performance parameter and the second performance parameter.

4. The method according to claim 1, wherein the determining first and second performance parameters comprises:
   determining a data throughput of each first user equipment and a data throughput of each second user equipment, respectively; and
   determining an average data throughput of the first user equipment and an average data throughput of the second user equipment.

5. The method according to claim 4, wherein the causing data exchange with each first and second user equipment comprises causing data exchange with each first and second user equipment for a predetermined time window,
   wherein the determining a data throughput of each first user equipment and a data throughput of each second user equipment is carried out within the predetermined time window.

6. The method according to claim 5, wherein the predetermined time window comprises a plurality of Transmission Time Intervals.

7. The method according to claim 4, wherein the determining an average data throughput of the first user equipment and an average data throughput of the second user equipment further comprises:
   selecting a subset of data throughputs of the first user equipment and a subset of the data throughputs of the second user equipment; and averaging the subset of data throughputs of the first user equipment and the subset of data throughputs of the second user equipment.

8. The method according to claim 7, wherein the selecting a subset of data throughputs of the first user equipment and a subset of the data throughputs of the second user equipment is based on a mean plus variance approach.

9. The method according to claim 1, wherein the selecting at least one first user equipment, at least one second user equipment, and at least one network node is based on power measurements.

10. The method according to claim 9, wherein the power measurements comprise Reference Signal Received Power measurements.

11. The method according to claim 1, wherein the radio resource parameter is based on Frequency Reuse Factor.

12. A computer program product directly loadable into a non-transitory computer readable medium of a computer, the computer program product comprising software code configured to perform the method of claim 1 when run on the computer.

13. A scheduler for scheduling allocation of radio resources in a cellular network, the scheduler comprising:
a selector configured to select:
at least one first user equipment for performing a first type data exchange based on Coordinated Multi-Point technique and a second type data exchange not based on the Coordinated Multi-Point technique;
at least one second user equipment for performing only the second type data exchange; and
at least one network node for performing the first type data exchange with the at least one first user equipment and the second type data exchange with at least one among the first and second user equipment;
a processor configured to:
determining, for the at least one network node, a radio resource parameter indicative of a number of radio resources to be allocated for the first type data exchange and of a number of radio resources to be allocated for the second type data exchange;
determining, upon data exchange with each first and second user equipment, first and second performance parameters indicative of performance of the data exchange with, respectively, the at least one first user equipment and the at least one second user equipment; and for
updating the radio resource parameter according to the first and second performance parameters; and
an allocator configured to allocate the radio resources for the at least one network node based on the radio resource parameter,
wherein the allocator continuously refines the allocation of the radio resources for the at least one network node.

14. The scheduler according to claim 13, further comprising an evaluation module for carrying out a comparison between the first performance parameter and the second performance parameter, the radio resource parameter being updated according to a result of the comparison.

15. The method according to claim 1, wherein the radio resource parameter includes a percentage of available radio resources to be allocated.

* * * * *